United States Patent [19]
Lipkin

[11] 3,778,085
[45] Dec. 11, 1973

[54] CONCEALED PNEUMATIC SAFETY SYSTEM

[76] Inventor: Martin Lipkin, 445 E. 86 St., New York, N.Y. 10028

[22] Filed: Oct. 6, 1971

[21] Appl. No.: 187,056

[52] U.S. Cl. ............... 280/150 AB, 137/45, 137/68, 222/5
[51] Int. Cl. ............................................ B60r 21/08
[58] Field of Search ............... 280/150 AB; 137/67, 137/68, 69, 45; 222/5

[56] References Cited
UNITED STATES PATENTS

| | | | |
|---|---|---|---|
| 3,656,791 | 4/1972 | Truesdell | 280/150 AB |
| 3,539,200 | 11/1970 | Chute | 280/150 AB |
| 3,628,809 | 12/1971 | Cirillo | 280/150 AB |
| 2,755,125 | 7/1956 | Hodges | 280/150 AB X |
| 3,640,546 | 2/1972 | Brawn | 280/150 AB |
| 3,689,105 | 9/1972 | Matsui et al. | 280/150 AB |
| 3,304,881 | 2/1967 | Grise | 137/45 X |
| 3,628,550 | 12/1971 | Cirillo | 280/150 AB X |
| 3,172,684 | 3/1965 | Isaac | 280/150 AB |
| 3,588,142 | 6/1971 | Gorman | 280/150 AB |
| 3,514,124 | 5/1970 | Richardson | 280/150 AB |

FOREIGN PATENTS OR APPLICATIONS 896,312  7/1953  Germany ................. 280/150 AB Primary Examiner—Kenneth H. Betts
Assistant Examiner—John P. Silverstrim
Attorney—Fidelman, Wolffe, Leitner and Hiney

[57] ABSTRACT

A concealed inertially operated pneumatic safety system including a box having an opening with diaphragm means therein, a collapsed balloon within said box fastened by gas-tight attachment, pressurized gas storage means and inertially powered gas release means, said gas release means being adapted to cause release of gas from said pressurized gas storage means in response to a predetermined deceleration or shock to said box, the released gas causing said balloon means to inflate sufficiently to force said diaphragm means aside and to fully inflate externally of said box means.

16 Claims, 12 Drawing Figures

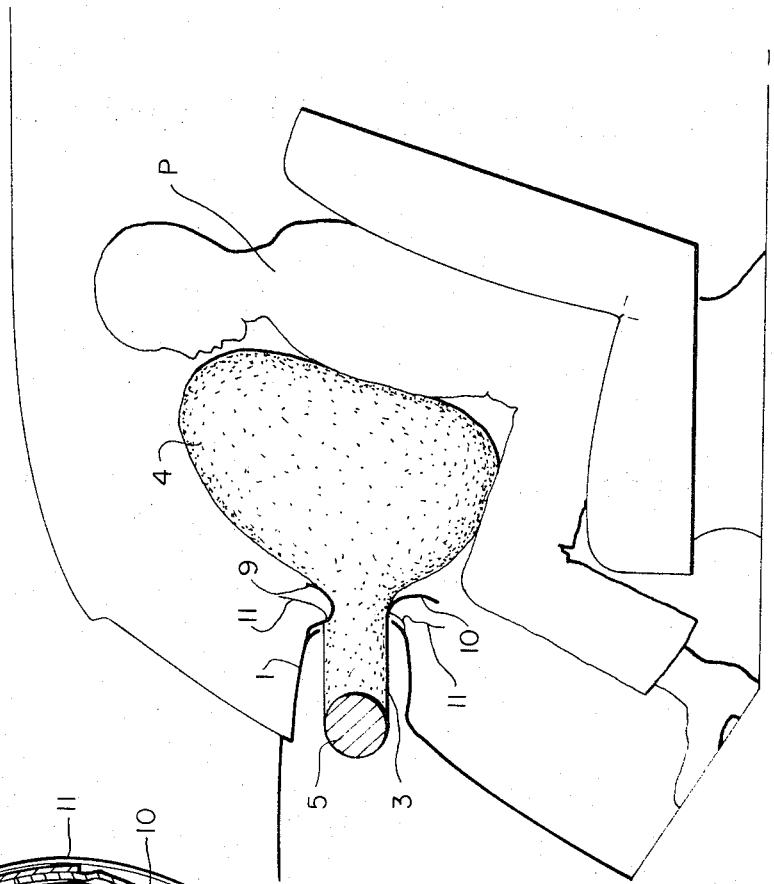
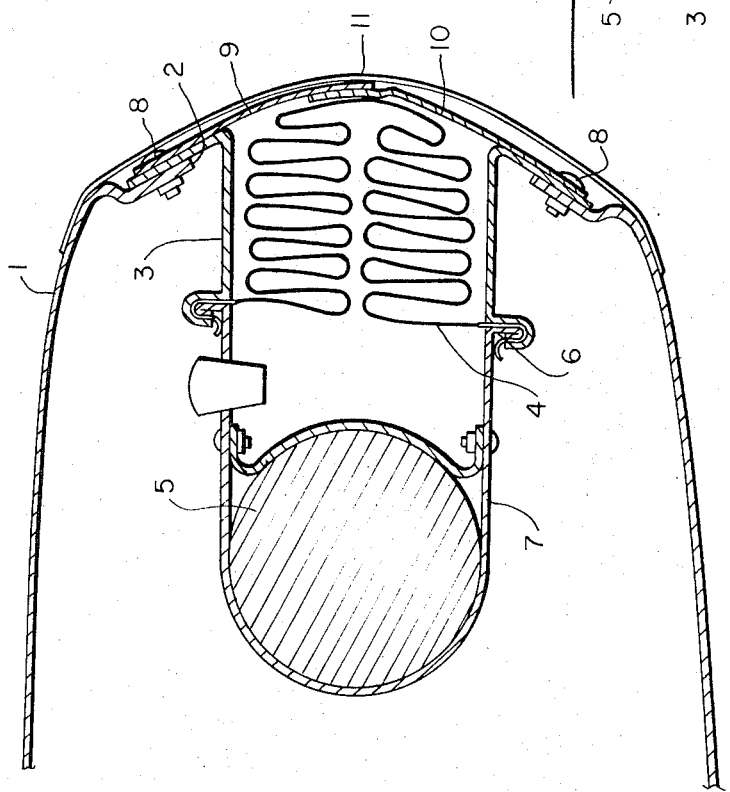

INVENTOR
MARTIN LIPKIN

BY *Sidelman, Waffle and Leitner*

ATTORNEY

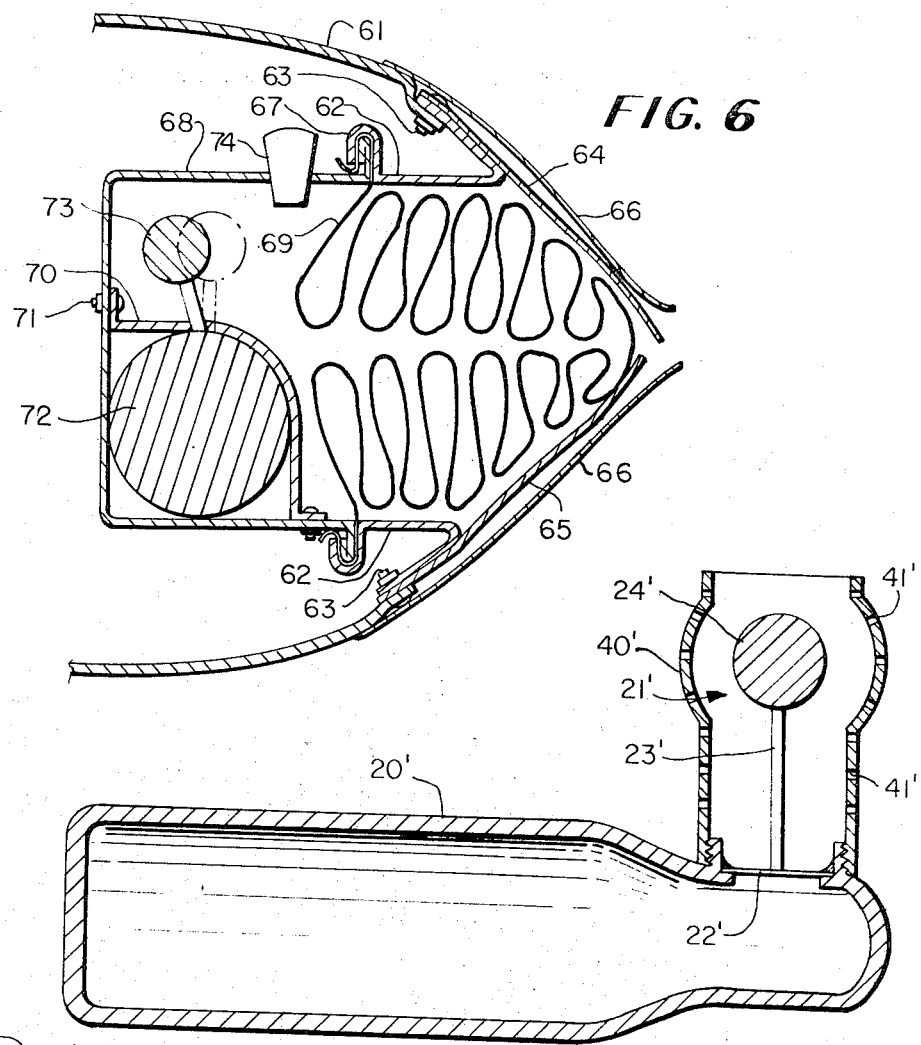

CONCEALED PNEUMATIC SAFETY SYSTEM

This invention relates to a concealed inertially operated pneumatic safety system for vehicles.

It is argued that a pneumatic balloon interposed between an automobile passenger and the vehicle structure in front of him would be more effective than the conventional lap belt and shoulder harness in protecting him from serious injury during a collision. But the widespread failure of the public to avail themselves of even the basic lap belts which are provided in modern automobiles makes it questionable whether pneumatic balloons would be used either, if their use involved any conscious effort on the part of the persons to be protected. A modern concept has therefore arisen of protecting automobile passengers against collisions in spite of themselves, by arranging to have cushioning pneumatic balloons automatically and instantly materialize in front of them, upon initiation of a sufficient rapid deceleration of the vehicle. Ideally, from a psychological as well as physical standpoint, each such balloon should be completely out of evidence prior to a collision, thus not only protecting it from abuse or accidental damage before it is needed, but as well insulating its beneficiary, the passenger, from an unpleasant awareness of the eventualities for which it is designed.

Needless to say, severe technological difficulties stand in the way of the goal of having the requisite safety balloons spring from concealment fully inflated when needed, and not before. It is well known that such balloons must be inflated in tens of milliseconds in order to be of any use during first moments of a collision, and this is tantamount to explosive inflation. If the balloon is fully concealed before inflation (for example, in the dashboard), its precipitous emergence from such protective concealment must be sure and minimally impeded. It must not bend portions of the surrounding vehicle structure into hazardous shapes, nor project massive portions of the concealing structure toward the passenger. It also must be without hazard of damage to the balloon itself.

Additionally, the means for inflating the balloon must respond absolutely to a collision, must be as securely passive as possible in the absence of a collision, and must retain the requisite high inflating power without diminution for extended periods of inactivity. It is the aim of the present invention to meet the foregoing criteria more simply, more reliably and more safely than known embodiments of the art. For brevity, the invention will be described in terms of a pneumatic balloon that springs from the front dashboard of an automobile to protect the front seat passengers other than the driver against frontal collision; but it will be readily appreciated that the same action can be transferred conveniently to the back of the front seat for the benefit of the rear seat passengers, and also to many other locations and orientations in a private vehicle or public conveyance, to meet other deceleration contingencies.

Accordingly, it is an object of this invention to provide a means for concealing an inflatable safety balloon in the front dashboard of an automobile.

It is a further object of this invention, while providing improved concealment and protection for a safety balloon, to nonetheless provide a negligible resistance to the emergence of the balloon when it is inflated, as well as improved protection against damage to the emerging balloon due to interference from, or snagging on, surrounding objects.

It is still a further object of the present invention to provide inflation of a safety balloon by means of an improved inertially actuated gas release mechanism which occupies minimum space and contains no moving parts before actuation, and in one form is situated entirely within the pressurized gas storage means.

It is another object of the present invention to provide a concealable inflatable vehicle safety balloon which, in its uninflated and concealed state, can form part of a single compact package together with its gas storage means and the complete inertially actuated gas release mechanism therefor.

A further object of the present invention is to provide gas storage means coupled integrally to the balloon to be inflated, not only eliminating connecting hoses and minimizing installation space but enabling the balloon itself to serve as an indicator of any gradual leakage of gas from the gas storage means.

Still a further object of the present invention is to provide pressure-limiting gas release valves which are not part of the balloon, but which instead are mounted on rigid portions of a pneumatic enclosure which communicates with the balloon.

These and other objects of the present invention will become more apparent as well as the nature and mode of operation of this invention when reference is made to the accompanying drawings wherein:

FIG. 1 is a left side view of an automobile dashboard broken away to show the present invention with its balloon uninflated and its exterior facade undisturbed, the gas container and release means being shown only in schematic form.

FIG. 2 is a view similar to FIG. 1, but showing mainly the positions of the balloon and its cover lips when the balloon is fully inflated, and the position of a front seat passenger in relation to the inflated balloon.

FIG. 6 is a view as in FIG. 1, but indicating a different geometry of the inertial gas-release mechanism, a different mounting of the balloon, and shown an early stage of the balloon's expansion.

FIG. 7 is a cut-away view of a different configuration, than in FIG. 3, of the inertially actuated gas release means in relation to the pressurized gas storage bottle.

FIG. 8 is a view showing an example of a combination of the inertial weight and diaphragm that ruptures the diaphragm by its own inertial force directly, as opposed to torque which is produced by the cantilever arrangements.

Figure 3:
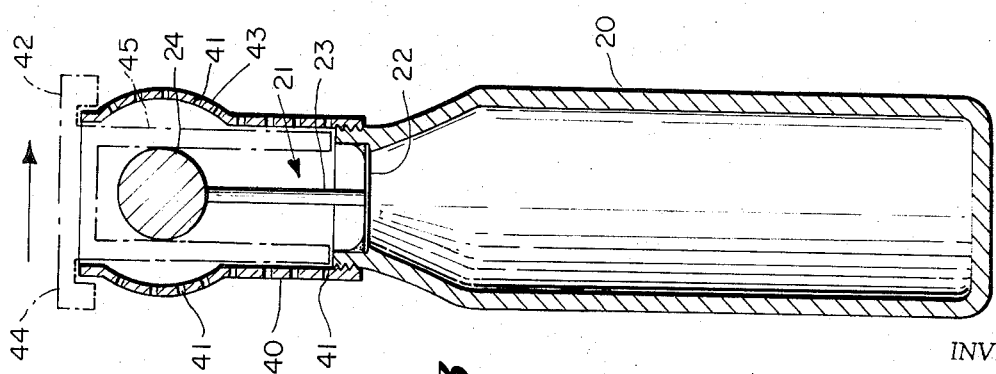
FIG. 3 is a top view of the gas storage and release means that FIG. 1 only shows schematically, and shows the general configuration of the inertial gas release mechanism.

Referring now to FIG. 1 there is shown in cut-away view an automobile dashboard 1, a recess 2 which affords mounting for a rigid box or container 3 which contains a folded safety balloon 4 and a container 5 for a pressurized gas and release means for the gas. The pressurized gas container and the gas release means form a single unit (as depicted in FIG. 3) which is located interiorly to the balloon 4. As one means of construction, two parts of the main box 3 and 7 surround the end of the balloon 4 by means of flange 6 forming a gas tight seal between the interior of the balloon and the main box which holds the gas storage means 5. The main box 3 is secured to the dashboard by bolts 8.

The dashboard opening 2, through which the box 3 is inserted for mounting and through which the balloon 4 issues when it is inflated, is covered by two flaps 9 and 10 made of flexible material such as felt or rubber, which are sufficiently thick to afford protection of the balloon against manipulation or accidental damage. The flaps are sufficiently flexible to permit easy expansion of the balloon, under which expansion the flaps fold backwards as shown in FIG. 2 to afford protection to the neck of the balloon where it might be thrust forcibly into contact with the dashboard by the impacting weight of the passenger P.

In FIGS. 1 and 2 the flaps are shown to be covered by an external finish sheet 11 and in FIG. 6 by an external finish sheet 66 whose purpose is purely cosmetic, that of preserving the interior decor of the automobile. For this purpose, the finish sheets 11 and 66 are opaque and may be printed with elegant designs or otherwise designed to harmonize with the remainder of the dashboard. The finish sheets 11 and 66 are light and flimsy from a mechanical standpoint so that they are easily ruptured by flaps 9 and 10 (FIGS. 1 and 2) and by flaps 64 and 65 (as shown in FIG. 6) when the balloon expands, and may thus be made of a very thin sheet of stretchable plastic such as polyethylene.

Alternatively, (not shown in the Figures), the finish sheet may be omitted and its function is taken over by one of the flaps, e.g., by the upper cover flap 9. In such event, the upper cover flap is elongated vertically so that it completely covers the balloon exit opening, and said flap itself is suitably decorated. The flap is fastened at its top edge, but is merely tucked into place at its bottom edge to remain free to be flapped out of the way when the balloon expands. In such a case, the lower flap may be omitted provided that its buffering protection between the expanded balloon and the dashboard is not essential.

When the gas is released from gas storage means 5 in FIG. 1, the gas that is released from storage finds itself immediately in the interior of the safety balloon 4 and begins to inflate the same, so that the balloon burgeons out of the dashboard, bending back the protective flaps, and, in an extremely short time, takes up a protective position in fron of the passenger(s) affected, as shown in FIG. 2.

It will be noticed that, in FIG. 1 (and, later, in FIG. 6), the gas storage means 5 and 72 communicate to the interior of the balloon directly, without any need for a coupling hose. This not only provides maximum speed in inflation, but is advantageous in that any undesired leakage of gas from the storage means will cause anomalous expansion of the balloon which then serves to warn that such leakage has occurred.

FIG. 3 shows a pressurized gas storage container or bottle 20, with a complete inertially actuated gas release means 21, suitable for use in the embodiment shown in FIGS. 1 and 2. The pressurized gas storage bottle 20 is hermetically sealed by means of a thin, rupturable metal diaphragm 22, by suitable attachment means such as soldering or brazing. These means are employed since the seal allows negligible gas leakage over extended periods of time. Attached to the rupturable diaphragm by welding or other suitable means is a rigid cantilever rod which carries an inertial weight 24 at its other extremity. When deceleration occurs along the line of motion shown by the arrow at the top of FIG. 3, the inertial weight 24 tends to continue in its motion, bending the rigid cantilevered rod 23, and therefore tending to tear the rupturable diaphragm 22. Up to a predetermined level of deceleration, this tendency is insufficient to rupture the diaphragm, but for larger decelerations, the bending of the rigid cantilevered rod 23 is designed to be able to tear the diaphragm 22 to effect release of the stored pressurized gas.

Figure 4A:
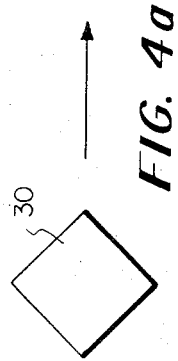
FIGS. 4a, 4b, 4c, 4d and 4e are cross sectional views of different possible designs for the cantilevered support rod of the gas release mechanism, taken in a plane parallel to the rupturable diaphragm, and show typical cross sections for that rod in relation to the direction of motion of the vehicle prior to deceleration which is shown by the arrow.
Figure 4B:
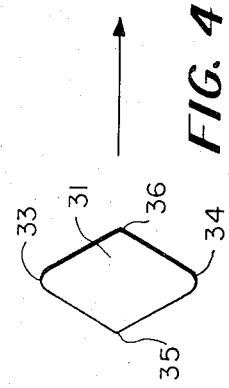
Figure 4C:
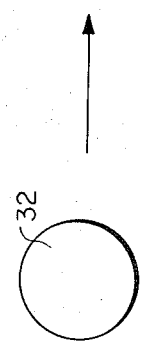
Figure 4D:
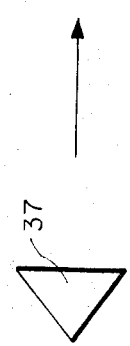
Figure 4E:
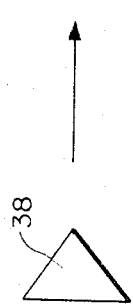

To facilitate tearing of the rupturable diaphragm by the rigid cantilever rod, the cross-sectional shape of that rod, may be chosen to have sharp corners as shown in FIGS. 4a, b, d, e. To facilitate rigorously equal tearing ability for decelerations oriented anywhere in a plane of directions parallel to the plane of the diaphragm, a circular cross-section 32 of the cantilever rod would be indicated, as shown in FIG. 4c. The cantilever rod cross-section 30 of FIG. 4b, as opposed to that of FIG. 4a, has two corners, 33, 34 rounded and the remaining two corners 35 and 36 located closer together which provides reduced likelihood of tearing of the diaphragm for decelerations oriented at right angles to the arrow direction and increased ease of tearing of the diaphragm for decelerations along the arrow direction. The cantilever rod cross-sections 37 and 38 shown in FIGS. 4d and 4e respectively are typical of cross-sections that may accomplish other degrees of discrimination between different directions of deceleration if desired.

In FIG. 3, a guard cylinder 40 may optionally be provided as shown, to effect protection of the inertial weight against accidental impact during transportation of the separate gas storage bottles and their assembly into balloon units. The guard cylinder 40 may be discarded after assembly, or may be left in place to prevent contact between the inertial weight and the folded balloon, as well as to serve as a baffle for gas released from storage; if it is left in place permanently, the guard cylinder should be provided with numerous perforations 41 as shown in FIG. 3, to permit easy outward flow of released gas.

In FIG. 3, also, a hollow cylindrical keeper piece 42 may be provided, as shown in phantom lines, to prevent motion of the inertial weight 21 prior to assembly of the complete balloon unit. The keeper piece may be discarded after such assembly. However, a member configured largely as said keeper piece 42 may be left permanently in place if made of a light material such as foamed plastic, to provide a restoring force for the inertial weight, against decelerations smaller than the lower design limit for gas release. Then, for larger decelerations than that design limit, the inertial weight will move in spite of the said member or keeper piece, by deforming or crushing said member or piece, and will then proceed to cause the cantilever rod to tear the gasreleasing diaphragm, the guard cylinder being widened as at 43 to allow for this. It will be appreciated that other means, such as opposing springs augmented by motion stops (not shown, such stops acting to restrain the motion of the inertial weight or its cantilever rod in the direction urged by such springs), can also be employed to control the motion of the inertial weight for decelerations smaller than the design limit for gas release.

To facilitate the action of the cantilever rod 23 and inertial weight 24 in tearing the gas-release diaphragm 22, the cantilever rod cross-section may be suitably shaped as explained previously. In addition, the diameter of the cantilever rod may also be decreased, its length increased, and the size of the inertial weight increased, to obtain a greater tearing effect. It will be appreciated that, at a nominal deceleration level of 10 g, an inertial weight which has the shape of a circular cylinder of diameter 2 inches and length 3 inches, and made of iron, has an effective "weight" of nearly 27 pounds. Thus, the mechanical energy which is available from simple inertia, when deceleration occurs, and which is designed to effect release of the stored gas to inflate the safety balloon, may be quite appreciable. This means of gas release is unique in that no distinct moving parts are involved, nor are any electrical or explosive means employed.

Figure 5:
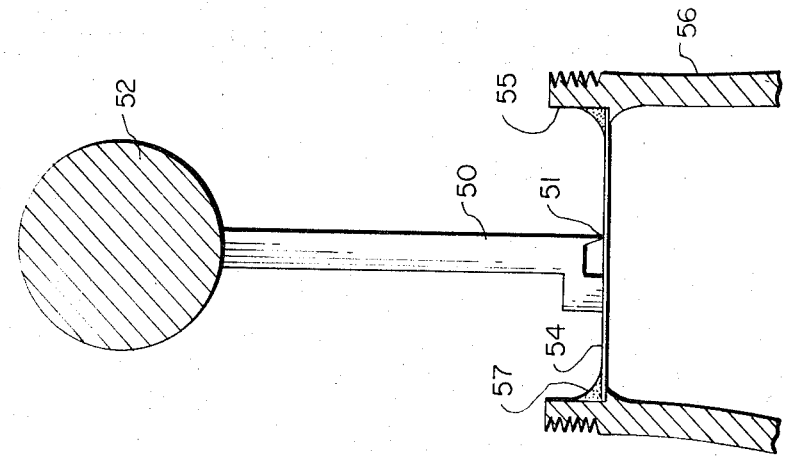
FIG. 5 is a view of a different type of attachment and a different structure of the inertial weight support rod to the rupturable diaphragm, taken in a plane containing the direction of vehicle motion and the long axis of the gas storage bottle.

To further facilitate tearing or puncturing of the gas-release diaphragm, additional means may be employed, such as the provision of stress "risers," or, stress-increasing indentations, formed in the diaphragm. Also as shown in FIG. 5, the foot of the cantilever rod 50 bearing weight 52 may be provided with a puncturing point 51 to puncture a diaphragm 54. The diaphragm is secured to the internal end 55 of a gas bottle 56 by brazing such as 57. It will be appreciated that such "can-opener" means may be designed in many ways, novelty being provided by its use in combination with a cantilever rod supporting an inertial weight.

As shown in FIG. 3, the cantilever rod extends substantially parallel to the long direction of the gas storage bottle, but this is not essential. For example, as shown in FIG. 7 and utilized in FIG. 6, the cantilever rod may extend perpendicular to that direction. And, whereas FIGS. 3 and 7 show the cantilever rod and inertial weight located outside the pressurized gas reservoir, their location inside that reservoir is also contemplated.

As mentioned briefly above in the discussion of FIG. 3, but applicable to all forms of the gas release mechanism, e.g., those depicted in FIGS. 3, 5, 7 and 8, there are opposing springs and stops, or keeper pieces made of crushable light material such as foamed plastic contemplated for use, whenever desired, to clamp or oppose the motion of the inertial weight or its cantilever rod against decelerations smaller than a lower design limit for gas release. The design of suitable configurations and types of such opposing springs and stops, or crushable members will readily suggest themselves to persons skilled in the art, and do not limit the scope of the present invention. For example, in FIG. 8 a crushable block of foamed plastic may be positioned between the inertial weight 83 and the right hand inner wall of the container 80, wedged snugly between those parts and cupped to engage the upper and lower surfaces shown for the weight 83 as shown in phantom lines.

FIG. 6 shows an alternate embodiment of the present invention showing a somewhat different arrangement of the gas pressure storage and release means, again emphasizing that no connecting hose is required to communicate released gas to the volume rendered captive by the balloon.

FIG. 6 depicts a balloon 69 in the early stages of expansion, as it pushes open the flaps 64 and 65 and ruptures the external finish sheet 66. In the form of FIG. 6 (similar to FIG. 1), the main box or container is formed in two parts or halves 62 and 68 which are attached together by flange 67 about a neck-opening of the balloon 69, forming a gas-tight seal between the interior of the balloon and half 68 of the box, which holds the gas storage release means 72. In this embodiment, the balloon is not manufactured to be a nearly completely closed entity, but is provided with a generally large and oblong opening whose dimensions approximate those of the opening in dashboard 61 that houses the entire apparatus; this neck-opening is secured between the portions 62 and 68 of the main box, thus affording greater convenience in the assembly of the entire system.

A further advantage of the embodiment of FIG. 6 is that gas pressure control valves such as pressure-limiting valves need not be located in walls of the balloon, but can be located in the walls of portion 68 of the main box, where they nevertheless communicate between the external atmosphere and the interior of the balloon. This more firm, out-of-the-way mounting of the gas pressure control valves enables them to be designed more reliably and optimally than would be possible if their design requirements included mounting anywhere on the flexible surface of the balloon. In particular, relatively massive gas pressure control valves can be used, whose location on the balloon would not be permissible due to their hazard to the vehicle occupants as the balloon expands.

Gas pressure control valves that may be contemplated for use in the version of FIG. 6 include, but are not limited to, the following manifestations of the known valve art: pressure-limiting valves, which open sufficiently to prevent the gas pressure from attaining values much above some predetermined value; irreversible gas-release valves, which remain open by an amount proportional to the maximum previous pressure experienced by them; time-delay valves, which provide a small mechanical time-delay between the application of pressure and their opening and which may be preferred for the present applications; spill valves, which can be manually controlled to release gas from a balloon to effect its rapid deflation when desired. It is to be understood, with reference to FIGS. 1 and 6 that any or all of the various types of gas pressure control valves may be employed, mounted where a valve 74 is shown only schematically in FIG. 6 to effectuate different programmings of the pressure rise and fall in the safety balloon, as may be necessary for its optimal effectiveness against various types or ranges of deceleration conditions.

FIG. 6 shows the use of the particular inertial gas-release configuration that is shown in FIG. 7, but the other possible configurations (e.g., that of FIG. 8) can equally be used as well. In FIG. 6, the resting position of the inertial weight employed is shown by broken lines, and a later position of this weight after crash-caused deceleration of the vehicle, and connoting a torn gas-release diaphragm, is shown in solid lines as 73.

The balloon attachment means is depicted in FIG. 6 as a type of rolled seam joint in which the free edge of the neck of the balloon 69 is clamped by the two halves 62 and 68 of the box, and thus trapped in the rolled seam. Alternate attachment means will suggest themselves to those skilled in the art. In this context, it should be borne in mind that the attachment must not only be tight against gas pressure, but must also hold the two halves of the box together against large pressure-produced mechanical forces which occur when the passenber impacts upon the balloon. The present versions of the invention, especially such as would utilize the rolled seam attachment means of FIG. 6, are oriented towards single-use application of the invention, without removability or replaceability of internal parts such as the gas storage bottle. And it may well be that such a philosophy of use would be safest in large-scale application, with trade occurring only in complete, factory guaranteed units. However, design modifications to increase demountability, to facilitate private inspection of inner parts of the invention, and the replacement or servicing of such individual parts, will readily suggest themselves to skilled persons, and do not extend the scope of the present invention.

FIG. 8 discloses a further embodiment of the gas storage and release means having a gas container 80, a rupturable diaphragm 81 with stress concentrating indentations 82. Secured to the diaphragm is inertial weight 83. The weight ruptures the diaphragm by its own inertial force, not torque as in the cantilever arrangements.

What is claimed is:

1. A concealed inertially operated pneumatic safety system, said system comprising a box means having an opening with diaphragm means therein, a collapsed balloon means within said box means, said balloon means being fastened by gas-tight attachment means to the interior of said box means to define an enclosure means, a gas storage means having an opening directly communicating with said enclosure means, a rupturable membrane covering said gas storage means opening and maintaining said gas in said gas storage means, an inertial weight secured to said rupturable membrane and adapted to angularly move and thereby rupture said membrane along the cross-sectional periphery of said inertial weight in response to a predetermined deceleration or shock to said box and release the gas in said gas storage means, causing said balloon means to inflate sufficiently to force said diaphragm means aside and to fully inflate externally of said box means.

2. A system as in claim 1 wherein said inertial weight comprises a rod of circular cross-section secured to said membrane to facilitate rupture of said membrane along the cross-sectional periphery of said rod and weight at the opposite end of said rod.

3. A system as in claim 1 wherein said inertial weight comprises a rod or rectangular cross-section secured to said membrane to facilitate rupture of said membrane along the cross-sectional periphery of said rod and a weight at the opposite end of said rod.

4. A system as in claim 1 wherein said inertial weight comprises a rod of triangular cross-section secured to said membrane to facilitate rupture of said membrane along the cross-sectional periphery of said rod and a weight at the opposite end of said rod.

5. A system as in claim 1 wherein said inertial weight comprises a rod of diamond cross-section secured to said membrane to facilitate rupture of said membrane along the cross-sectional periphery of said rod and a weight at the opposite end of said rod.

6. A system as in claim 1 wherein said gas storage means comprises a bottle having an opening therein, said rupturable membrane sealing said bottle's opening, said inertial weight comprises a rod secured to said membrane and a weight at the opposite end of said rod, a perforated guard means surrounding said weight and rod, and a distensible guard means adapted to be inserted between said perforated guard means and said weight to prevent angular movement of said inertial weight up to a certain level of inertial force, said inertial weight being exterior of said bottle.

7. A system as in claim 6 wherein said perforated means comprises a hollow cylindrical member coaxial with said rod, said member having an enlarged circumferential area adjacent the inertial weight.

8. A system as in claim 6 wherein said distensible guard means is adapted to be crushable above said level of inertial force.

9. A system as in claim 1 wherein said box means comprises two portions, said gas-tight attachment means comprising interlocking flange means on each of said portions, said flange means clamping the edge of said balloon means therebetween to form a gas-tight attachment.

10. A system as in claim 1, wherein said diaphragm means comprises two flaps, one flap substantially overlying the other to provide an easily displaced cover for inflation of said balloon means.

11. A system as in claim 1 wherein said enclosure means has a gas pressure limiting valve means therein.

12. A system as claim 1 wherein said diaphragm means comprises two overlying flaps and a rupturable cosmetic cover sheet adjacent said flaps and external of said box means.

13. A system as in claim 1 wherein said inertial weight comprises a rod attached to said membrane having puncturing means thereon adjacent its point of attachment to said membrane and a weight at the opposite end of said rod, said puncturing means adapted to puncture said membrane upon a predetermined angular motion or bending of said rod about its locus of attachment to said rupturable membrane.

14. A concealed inertially operated pneumatic safety system, said system comprising a box means having an opening with diaphragm means therein, a collapsed balloon means within said box means, said balloon means being fastened by gas-tight attachment means to the interior of said box means to define an enclosure means, a gas storage means having an opening directly communicating with said enclosure means, a rupturable membrane covering said gas storage means opening and maintaining said gas in said gas storage means, an inertial weight secured to said rupturable membrane inside said gas storage means and adapted to rupture said membrane in response to a predetermined deceleration or shock to said box and release the gas in said gas storage means, causing said balloon means to inflate sufficiently to force said diaphragm means aside and to fully inflate externally of said box means, and a distensible guard means between said inertial weight and the interior of said gas storage means for preventing movement of said inertial weight below said predetermined deceleration or shock.

15. A system as in claim 14 wherein said rupturable membrane includes stress concentrating indentations.

16. A system as in claim 14 wherein said distensible guard means surrounds said inertial weight, said distensible guard means adapted to be crushed above said predetermined deceleration or shock level of inertial force.

* * * * *